US007695055B2

(12) United States Patent
Tsukamoto

(10) Patent No.: US 7,695,055 B2
(45) Date of Patent: Apr. 13, 2010

(54) CAB STRUCTURE OF CONSTRUCTION MACHINE

(75) Inventor: Daisuke Tsukamoto, Hirakata (JP)

(73) Assignee: Komatsu Ltd., Tokyo (JP)

( * ) Notice: Subject to any disclaimer, the term of this patent is extended or adjusted under 35 U.S.C. 154(b) by 99 days.

(21) Appl. No.: 12/065,341

(22) PCT Filed: Aug. 30, 2006

(86) PCT No.: PCT/JP2006/317085

§ 371 (c)(1),
(2), (4) Date: Feb. 29, 2008

(87) PCT Pub. No.: WO2007/029576

PCT Pub. Date: Mar. 15, 2007

(65) Prior Publication Data

US 2009/0134665 A1 May 28, 2009

(30) Foreign Application Priority Data

Sep. 6, 2005 (JP) ............................. 2005-258522

(51) Int. Cl.
*B60R 21/13* (2006.01)
(52) U.S. Cl. ............................................... 296/190.11
(58) Field of Classification Search ............ 296/190.11, 296/155, 190.08; 180/89.12; 16/87 R, 91
See application file for complete search history.

(56) References Cited

U.S. PATENT DOCUMENTS

| 6,611,990 B1* | 9/2003 | Sogo et al. .................. 16/87 R |
| 7,246,846 B2* | 7/2007 | Shioji et al. ............ 296/190.11 |
| 2005/0006157 A1 | 1/2005 | Shioji et al. |

FOREIGN PATENT DOCUMENTS

| GB | 2 441 485 A | 3/2008 |
| JP | 2001-49696 A | 2/2001 |
| JP | 2001-207479 A | 8/2001 |
| JP | 2004-224083 A | 8/2004 |

* cited by examiner

Primary Examiner—Joseph D Pape
(74) Attorney, Agent, or Firm—Global IP Counselors

(57) ABSTRACT

The frame body is formed by a plurality of pipe-shaped members including a first column portion, a beam portion, the front end portion of which is connected to the upper end portion of the first column portion, and a middle column member that is disposed rearward from the first column portion. The upper guide portion is provided along a beam portion in a position ranging from a first position to a second position. Here, the first position is located frontward from the middle column member and rearward from the first column portion, and the second position is located rearward from the middle column member.

6 Claims, 9 Drawing Sheets

CAB STRUCTURE OF CONSTRUCTION MACHINE

CROSS-REFERENCE TO RELATED APPLICATIONS

This U.S. National stage application claims priority under 35 U.S.C. §119(a) to Japanese Patent Application No. 2005-258522, filed in Japan on Sep. 6, 2005. The entire contents of Japanese Patent Application No. 2005-258522 are hereby incorporated herein by reference.

TECHNICAL FIELD

Present invention relates to a cab structure of a construction machine.

BACKGROUND ART

Recently, construction machines have been commonly provided with a cab structure that is configured to protect an operator when the machines fall down. Accordingly, the roll over protective structure (ROPS) performance has been considered as an important factor. For example, a Japanese Patent Application Publication No. JP-A-2004-224083 discloses a cab structure of a construction machine, which is a frame structure formed by assembling a variety of pipe-shaped members in a basket shape. According to this type of structure, it is possible to remarkably enhance stiffness with respect to deformation that is caused when a construction machine falls down, compared to the cab structure made up only by the combination of sheet metal members.

On the other hand, construction machines, which are configured to be used in such a situation as the urban civil engineering, are often provided with a doorway through which an operator enters/exits and a sliding door for opening/closing the doorway. The sliding door is configured to be guided by a guide rail that is provided in the vicinity of the doorway so as to be disposed along the lateral surface of a cab, and is also configured to be allowed to move along the lateral side of the cab. Even when the construction machine is used in a narrow space where a road construction or the like is performed, the above described configuration makes it possible to prevent the opened door from protruding outside a swivel platform, and also makes it possible for an operator to easily get on and off the construction machine.

SUMMARY OF THE INVENTION

However, when a sliding door is provided for the above described cab structure formed by the pipe-shaped members, the pipe-shaped members, which are provided along the vertical direction, are disposed on the front side of the doorway. Therefore, it is difficult to provide a guide portion in a state that the guide portion reaches the front end portion of the cab. In other words, in a cab made up not by the combination of the pipe-shaped members but by the combination of the sheet metal members, the pipe-shaped members are not disposed on the front side of the doorway. Accordingly, it is possible to easily form a recess portion for disposing the guide portion by performing press working or the like with respect to the sheet metal members. However, in the above described cab structure formed by the pipe-shaped members, it is more difficult to form a recess portion in the pipe-shaped members disposed on the front side of the doorway, compared to the sheet metal members. Therefore, the pipe-shaped members block and limit a position on which the front end of the guide portion is allowed to be put. Because of this, the entire length of the guide portion is configured to be short. Accordingly, the amount of movement of the sliding door is configured to be small. As a result, there is a possibility that the opening width of the sliding door becomes narrow.

An object of the present invention is to provide a cab structure of a construction machine, which is capable of securing the opening width of a sliding door to be wide.

A cab structure of a construction machine in accordance with a first aspect of the invention includes a frame body, a sliding door, and a guide portion. The frame body is formed by a plurality of pipe-shaped members including a first column portion, a beam portion, and a second column portion. Here, the first column portion is provided along the vertical direction. The beam portion is provided along the back and forth directions, and the front end portion of the beam portion is connected to the upper end portion of the first column portion. The second column portion is provided along the vertical direction, and is disposed rearward from the first column portion. The sliding door is configured to open and close a doorway provided between the first column portion and the second column portion. The guide portion is provided along the beam portion in a position ranging from a first position to a second position, and is configured to guide the sliding door. Here, the first position is located frontward from the second column portion and rearward from the first column portion. The second position is located rearward from the second column portion.

Note that the first column portion and the second column portion may not be provided in parallel to the vertical direction definitely, and may be provided to be inclined to some extent. Also, the beam portion may not be provided in parallel to the back and forth directions definitely, and may be provided to be inclined to some extent.

According to the cab structure of a construction machine, the guide portion is provided in the position ranging from the first position that is located frontward from the second column portion and rearward from the first column portion to the second position that is located rearward from the second column portion. Therefore, it is possible to avoid interference with the first column portion and it is also possible to secure the entire length of the guide portion to be long. With the above configuration, it is possible to secure the opening width of the sliding door to be wide.

A cab structure of a construction machine in accordance with a second aspect of the invention is the cab structure of a construction machine according to the first aspect. Here, the guide portion is a member for guiding the sliding door while it restricts movement of the sliding door in the horizontal direction. In addition, the cab structure of a construction machine further includes a first support member. The first support member is provided below the guide portion along the beam portion. The upper end of the second column portion is fixed to the lower surface of the first support member, and the sliding door is supported by the upper surface thereof.

According to the cab structure of a construction machine, the upper end of the second column portion is fixed to the lower surface of the first support member that supports the sliding door. Therefore, load applied by the sliding door is supported by the second column portion through the first support member. Accordingly, it is possible to further reliably support the sliding door.

A cab structure of a construction machine in accordance with a third aspect of the invention is the cab structure of a construction machine according to the first or the second aspect. Here, the guide portion is provided to pass through a position right above the second column portion.

According to the cab structure of a construction machine, the guide portion passes through the position right above the second column portion. Therefore, it is possible to avoid interference with the second column portion. In addition, it is possible to prevent the cab from externally bulging, compared to a case that the guide portion is provided to pass through the outside of the second column portion. Therefore, it is possible to compactly form the cab.

A cab structure of a construction machine in accordance with a fourth aspect of the invention is the cab structure of a construction machine according to the second aspect. Here, the second column portion is positioned on the outside of the first column portion in the right and left directions.

A cab structure of a construction machine in accordance with a fifth aspect of the invention is the cab structure of a construction machine according to the second aspect, and further includes a second support member. The second support member is a member that is provided along the beam portion above the first support member so as to be opposed to the first support member and laterally protrudes from the beam portion. In addition, the guide portion is provided on the lower surface of the second support member. In addition, the sliding door includes a first guide roller and a second guide roller. The first guide roller is a member supported by the upper surface of the first support member. The second guide roller is a member that is guided by the guide portion while it is restricted to move in the horizontal direction by the guide portion.

According to the cab structure of a construction machine, the first guide roller is supported by the first support member. Accordingly, load applied by the sliding door in the vertical direction is supported. In addition, the second guide roller is guided by the guide portion. Accordingly, movement of the sliding door in the horizontal direction is restricted, and the sliding door is allowed to move along the lateral surface of the cab. Furthermore, the first support member and the second support member are provided along the beam. Accordingly, it is possible to easily provide the support structure of a sliding door without performing complicated processing with respect to the beam portion.

A cab structure of a construction machine in accordance with a sixth aspect of the invention is the cab structure of a construction machine according to the fifth aspect, and is a type of a cab structure of a construction machine that the cab structure is disposed on an upper swivel attached on a base carrier. In addition, according to the cab structure of a construction machine, the lateral surface on which the sliding door is provided is formed in a curved shape that externally bulges.

In the cab structure of a construction machine, the lateral surface on which the sliding door is provided is formed in a curved shape that externally bulges. Accordingly, it is possible to reduce the swivel radius during swiveling of the upper swivel.

In addition, as described above, when the lateral surface of the cab is formed in a curved shape that externally bulges, the width of the cab is formed to be smaller toward the front side. Accordingly, a space for providing the front end portion of the guide portion is limited. However, according to the cab structure of a construction machine, it is possible to secure the entire length of the guide portion to be long. Therefore, it is possible to secure the opening width of the sliding door to be wide.

A cab structure of a construction machine in accordance with a seventh aspect of the invention includes a frame body, a sliding door, and a guide portion. The frame body is formed by a plurality of pipe-shaped members including a left front column member, a right front column member, a left rear column member, a right rear column member, and a middle column member. Here, the left front column member includes a first column portion that is provided along the vertical direction and a beam portion that is provided along the back and forth directions and the front end portion thereof is connected to the upper end portion of the first column portion. The right front column member is formed in the same shape as the left front column portion, and is disposed away from the left front column member in the right and left directions. The left rear column member is provided along the vertical direction, and is positioned rearward from the first column portion of the left front column member. The right rear column member is provided along the vertical direction, and is positioned rearward from a column portion of the right front column member. The middle column member is provided along the vertical direction, and is positioned between the first column portion and the left rear column member in the back and forth directions. The sliding door is configured to open and close a doorway provided between the first column portion and the middle column member. The guide portion is provided along the beam portion of the left front member in a position ranging from a first position that is located frontward from the middle column member and rearward from the first column portion to a second position that is located rearward from the middle column member, and is configured to guide the sliding door.

According to the cab structure of a construction machine, the guide portion is provided in the position ranging from the first position that is located frontward from the middle column member and rearward from the first column portion to the second position that is located rearward from the middle column member. Accordingly, it is possible to avoid interference with the first column portion and it is also possible to secure the entire length of the guide portion to be long. With the above configuration, it is possible to secure the opening width of the sliding door to be wide.

DETAILED DESCRIPTION OF THE PREFERRED EMBODIMENTS

Figure 1:
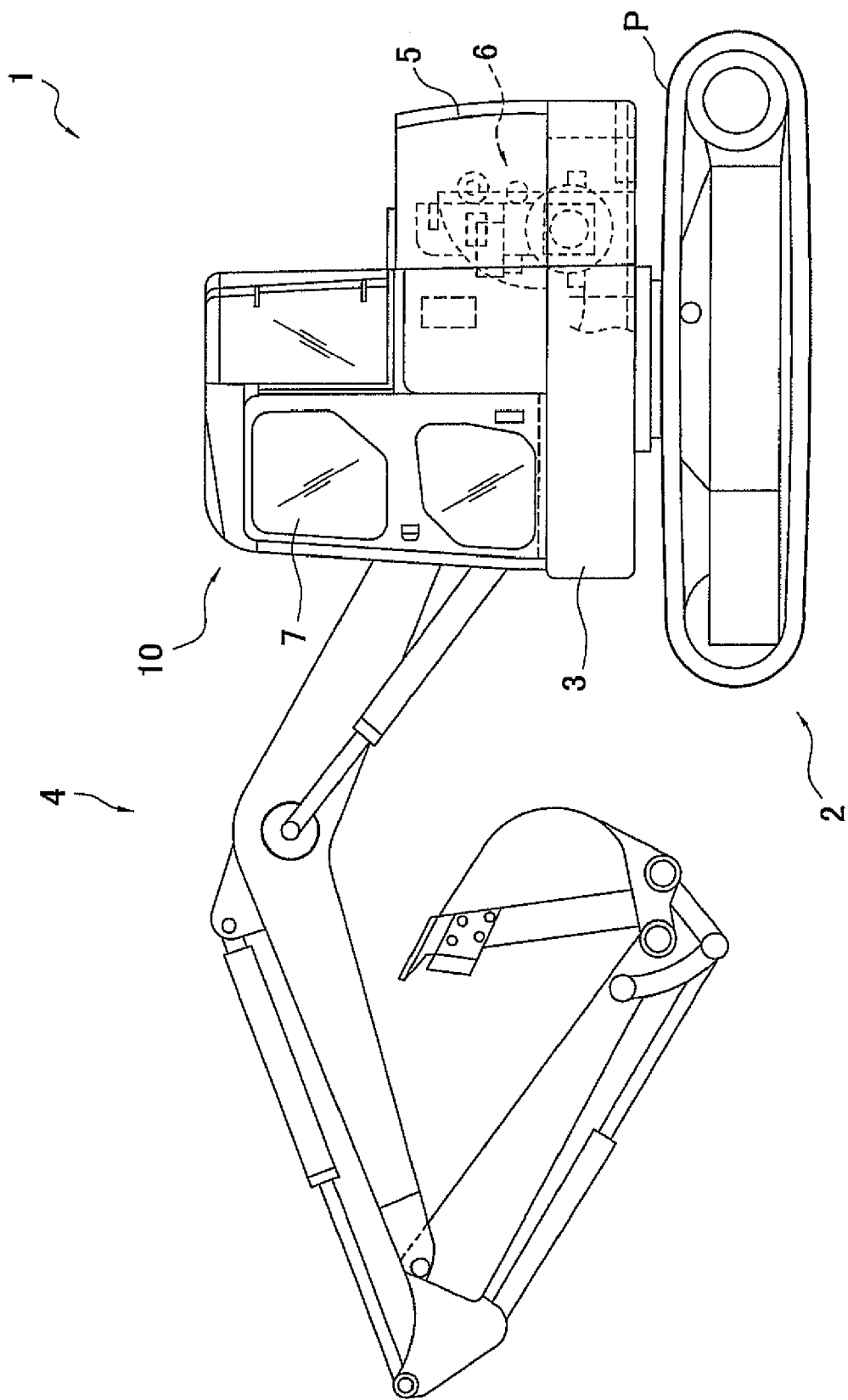
FIG. 1 is a lateral view of a hydraulic excavator.
Figure 2:
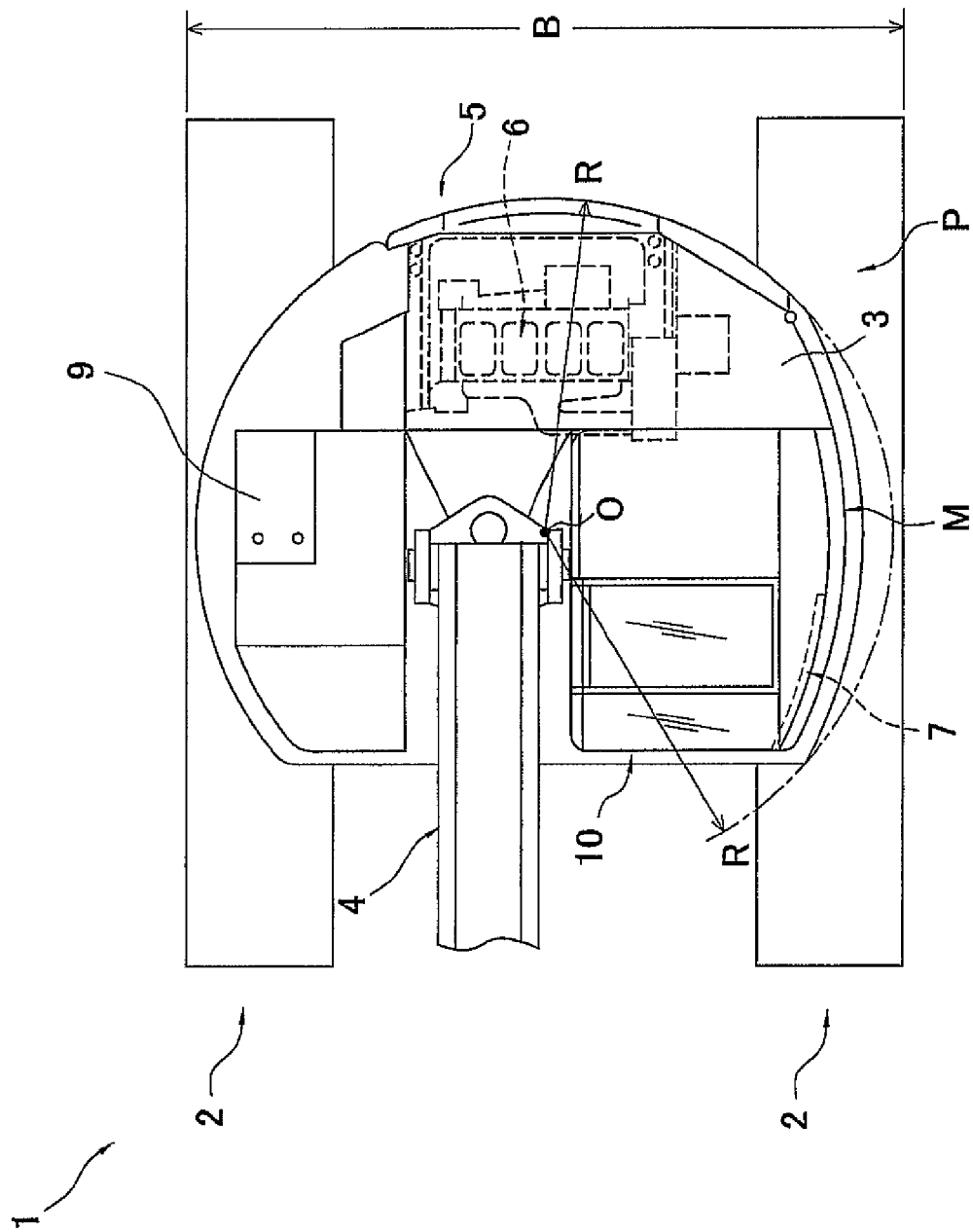
FIG. 2 is a top view of the hydraulic excavator.

FIGS. 1 and 2 illustrate a hydraulic excavator 1 to which a cab structure of a construction machine in accordance with an embodiment of the present invention is applied. FIG. 1 is a lateral view of the hydraulic excavator 1, and FIG. 2 is a top view of the hydraulic excavator 1. Note that the terms "right and left," "back and forth," and "front side and rear side" are used to indicate directions based on the direction that an operator being seated within a cab 10 faces.

(Entire Configuration of Hydraulic Excavator 1)

The hydraulic excavator 1 in accordance with the present embodiment includes a base carrier 2, a swivel platform 3, an operating machine 4, a counterweight 5, an engine 6, a machine room 9, and the cab 10. In addition, the hydraulic excavator 1 is a small rear-swivel type hydraulic excavator in which the swivel radius R (see FIG. 2) of the machine excluding the operating machine 4 is configured to be a predetermined value or less and the amount of a portion of the swivel platform 3 protruding from the base carrier 2 is configured to be 10% or less.

The base carrier 2 allows the hydraulic excavator 1 to move back and forth by rotating crawler belts P that are wound around the right and left end portions of the base carrier 2 in the traveling direction, and mounts the swivel platform 3 on the upper side thereof such that the swivel platform 3 is allowed to swivel.

The swivel platform 3 is allowed to swivel on the base carrier 2 in an arbitrary direction, and mounts the operating machine 4, the counterweight 5, the engine 6, and the cab 10 on the upper side thereof.

The operating machine 4 is configured to include a boom, an arm attached to the tip of the boom, and a bucket attached to the tip of the arm, and performs an operation in a civil engineering site where excavation of earth and sand, sand gravel, and the like are performed, while moving up and down the arm, the bucket, and the like by means of a hydraulic cylinder.

For example, the counterweight 5 is formed by pouring scrap iron, concrete, and the like into a box that is formed by assembling steel plates and then solidifying them. The counterweight 5 is provided on the rear portion of the swivel platform 3 for the purpose of balancing the vehicle body while excavation or the like is performed.

The engine 6 is a driving source for driving the base carrier 2 and the operating machine 4, and is disposed in a position adjacent to the counterweight 5.

The machine room 9 is disposed lateral to the operating machine 4, and accommodates a fuel tank, a hydraulic oil tank, a control valve, and the like (not illustrated in the figure).

Figure 3:
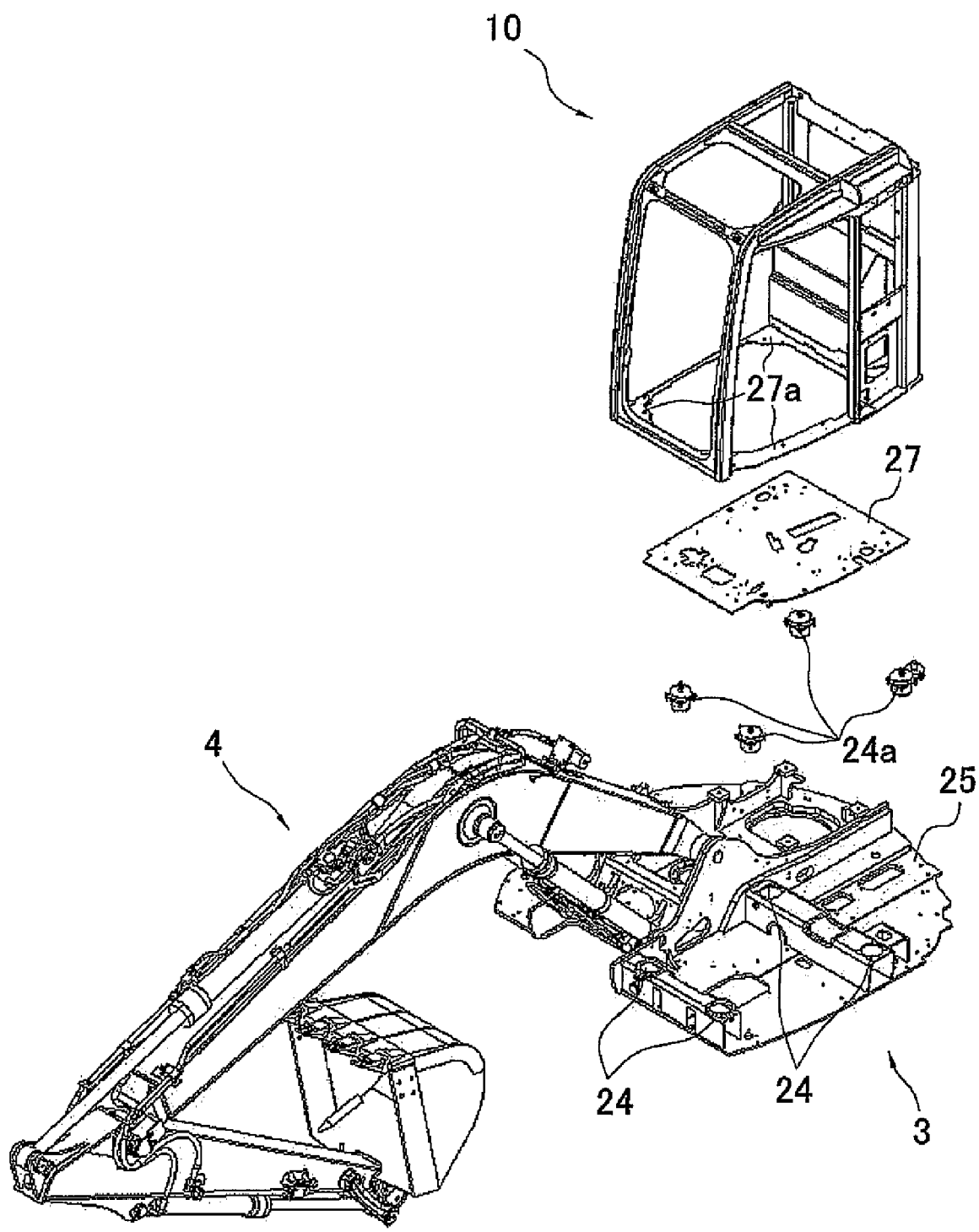
FIG. 3 is a diagram illustrating how a cab is attached to a floor panel.

The cab 10 is an operation room that an operator of the hydraulic excavator 1 gets on and off, and is disposed on the left front portion lateral to the operating machine 4 on the swivel platform 3 so that the operator is capable of seeing the tip of the operating machine 4. Also, as illustrated in FIG. 3, the cab 10 is mounted on four mount portions 24 formed on the left front side on a swivel frame 25, which forms an upper side portion of the swivel platform 3, while anti-vibration devices 24a and a floor panel 27 are fixed to the floor frame 27a of the cab 10 by screws (not illustrated in the figure). Accordingly, the cab 10 is fixedly disposed on the swivel platform 3 (swivel frame 25) while it is supported in four points on the swivel plateform 3.

The cab structure of the cab 10 will be hereinafter described in detail.

(Structure of Cab 10)

Figure 4:
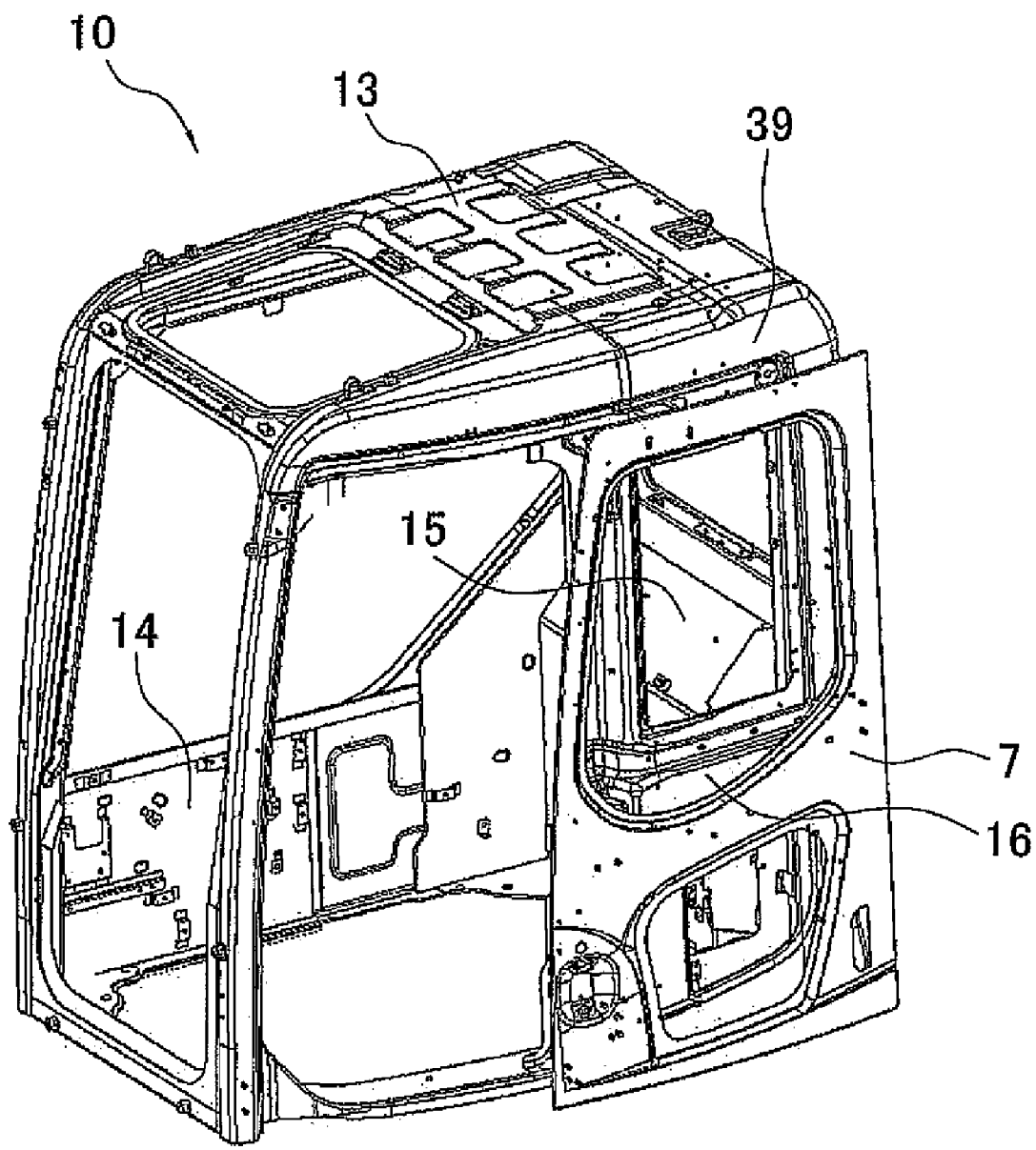
FIG. 4 is an exterior perspective view of the cab.

As illustrated in FIG. 4, the cab 10 is a box-shaped structure that a space for an operator is formed in the interior thereof, and a seat on which the operator is seated, a handle, a pedal, and the like, which are used for an operation, and a variety of measuring instrument gauges are installed in the interior thereof (not illustrated in the figure).

As illustrated in FIG. 2, the cab 10 includes a curved shape (hereinafter described as a circular-arc portion), which is produced by externally bulging a central portion M of the left lateral portion of the cab 10 so as to approximately fit in an outer peripheral portion of a circle with radius R, the center of which is a swivel center O of the swivel platform 3. Accordingly, the hydraulic excavator 1 is capable of performing an operation in such a narrow space as a road construction site as a small rear-swivel type hydraulic excavator that is configured to prevent a large portion of the swivel platform from externally extending from the base carrier 2 even during swiveling. In addition, a sliding door 7 through which an operator get on and off is attached to the circular-arc portion. Accordingly, even when the sliding door 7 is opened, it is possible to reduce the amount of a portion of the sliding door 7 that externally protrudes from the area of the swivel platform 3 with the swivel radius R to the limit. As a result, the cab 10 is prevented from exceeding the vehicle body width B (see FIG. 2) and from making contact with an adjacent building and the like. Accordingly, it is possible to secure the volume of the interior of the cab 10 to a maximum extent.

As illustrated in FIG. 4, the cab 10 includes a frame body 11 (see FIG. 5), a supporting member 12 (see FIG. 5), a plurality of panel members 13-16, the sliding door 7, an upper guide portion 17 (see FIG. 9(a)), a lower guide portion 18 (see FIG. 9(b)), and the like.

(Frame Body 11)

Figure 5:
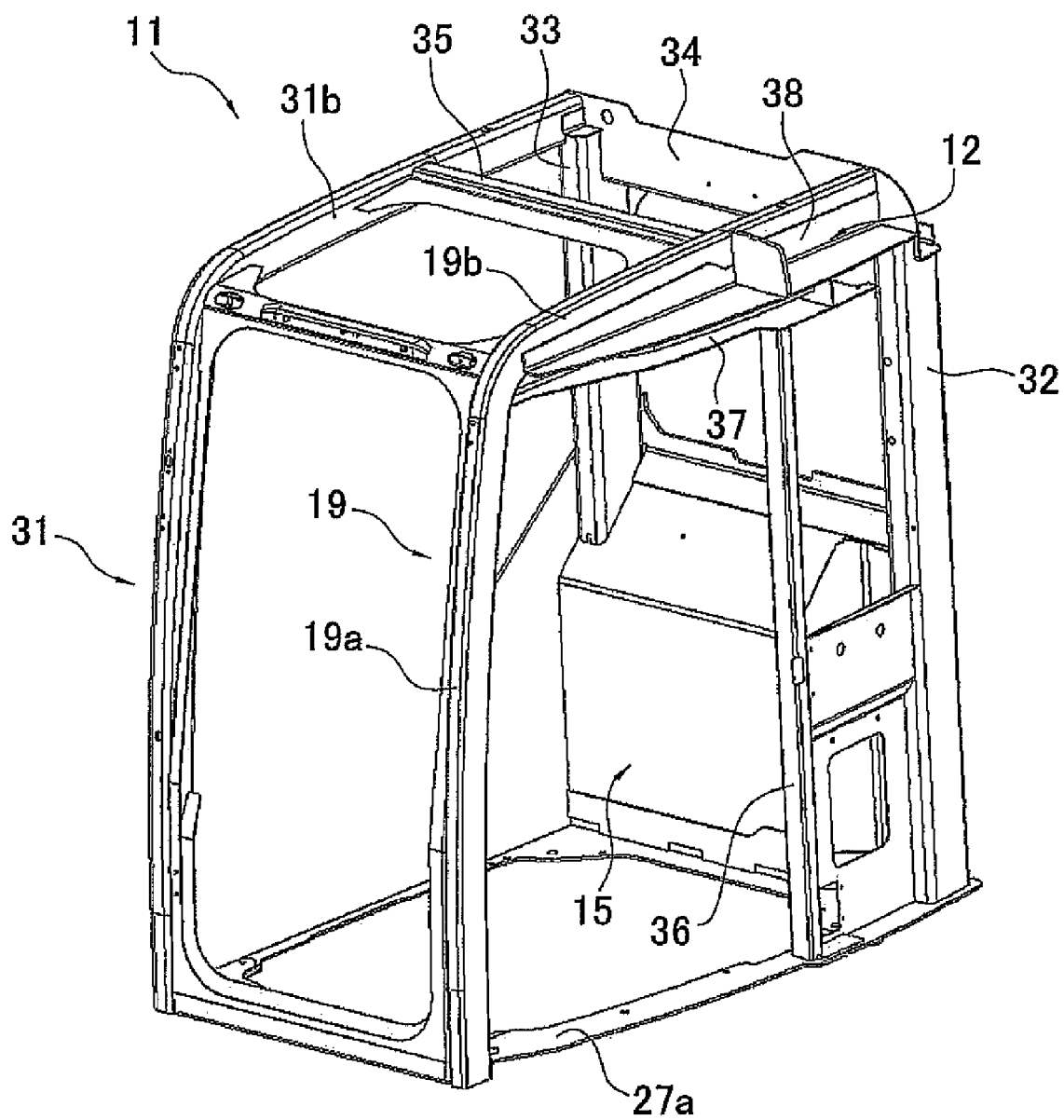
FIG. 5 is an exterior perspective view of a frame body.

As illustrated in FIG. 5, the frame body 11 is a framework of the cab 10, which is formed by the combination of a plurality of pipe-shaped members and sheet steel members. More specifically, the frame body 11 includes a left front column member 19, a right front column member 31, a left rear column member 32, a right rear column member 33, a rear beam member 34, a middle beam member 35, and a middle column member 36. Note that FIG. 5 is an exterior perspective view of the frame body 11, and illustrates a state in which the plurality of panel members 13-16, the sliding door 7, and the like are removed from the cab 10 illustrated in FIG. 4.

The left front column member 19 is formed by bending a pipe-shaped member in the vicinity of the central portion thereof, and includes a first column portion 19a that is disposed along approximately the vertical direction, and a beam portion 19b, which is disposed along the back and forth directions in approximately the horizontal direction and thereof is connected to the upper end portion of the first column portion 19a. The first column portion 19a is disposed upright on the floor frame 27a, and slightly slants such that the upper portion thereof is positioned rearward. Thus, the first column portion 19a and the beam portion 19b are formed by bending a pipe-shaped member. Accordingly, it is possible to reduce the number of parts forming the frame 11 and also achieve a high-stiffness frame body 11. Note that a right front column member 31 also has the same structure as this.

The left rear column member 32 is formed by a straight pipe-shaped member, and is disposed along approximately the vertical direction. Also, a cutout is formed in the upper end portion of the left rear column member 32 so that it fits with the shape of the rear beam member 34, which is joined to the left rear column member 32. The cutout portion and the lateral surface of the rear beam member 34 are joined. Furthermore, the lower end portion of the left rear column member 32 is attached to the floor frame 27a, and is disposed upright on the floor frame 27a as is the case with the first column portion 19a. In addition, the floor frame 27a includes portions that are positioned approximately right above the above described mount portion 24, and the portions are attached to the mount portions 24 together with the floor panel 27 through the anti-vibration devices 24a (see FIG. 3).

A right rear column member 33 is also formed by a straight pipe-shaped member as is the case with the left rear column member 32, and is disposed along approximately the vertical direction. Also, a cutout is formed in the upper end portion thereof such that it fits with the shape of the rear beam member 34, which is joined to it. The cutout portion and the lateral surface of the rear beam member 34 are also joined as is the case with the left rear column member 32. Note that the lower end portion of the right rear column member 33 does not reach the level (i.e., height position) of the floor frame 27a, and the right rear column member 33 is joined to the upper portion of the rear panel 15, the lower portion of which is inwardly bent. Accordingly, a recess space, which is inserted toward the inside of the cab 10, is formed on the rear side of the rear panel 15.

The rear beam member 34 is formed by a sheet metal member that the cross-section thereof is formed in approximately an L-shape. The rear beam member 34 joins the rear end portion of the beam portion 19b of the left front column member 19 and the upper end portion of the left rear column member 32. In addition, the rear beam member 34 is joined to the rear end portion of the beam portion 31b of the right front column member 31 and the upper end portion of the right rear column member 33. More specifically, the rear end portion of the beam portion 19b of the left front column member 19 is joined to a surface approximately parallel to the vertical direction in approximately the L-shaped cross-section shape of the rear beam member 34. On the other hand, the upper end portion of the left rear column member 32 is joined to a surface approximately parallel to the horizontal direction in approximately the L-shaped cross-section shape of the rear beam member 34. The beam member 31b of the right front column member 31, and the right rear column member 33 also have the same configuration as this.

The middle beam member 35 is formed by a straight pipe-shaped member and a sheet metal member, and is disposed along the horizontal direction. One end of the middle beam member 35 is fixed to the inner surface of the beam portion 19b of the left front column member 19, and the other end thereof is fixed to the inner surface of the beam portion 31b of the right front column member 31.

Figure 6:
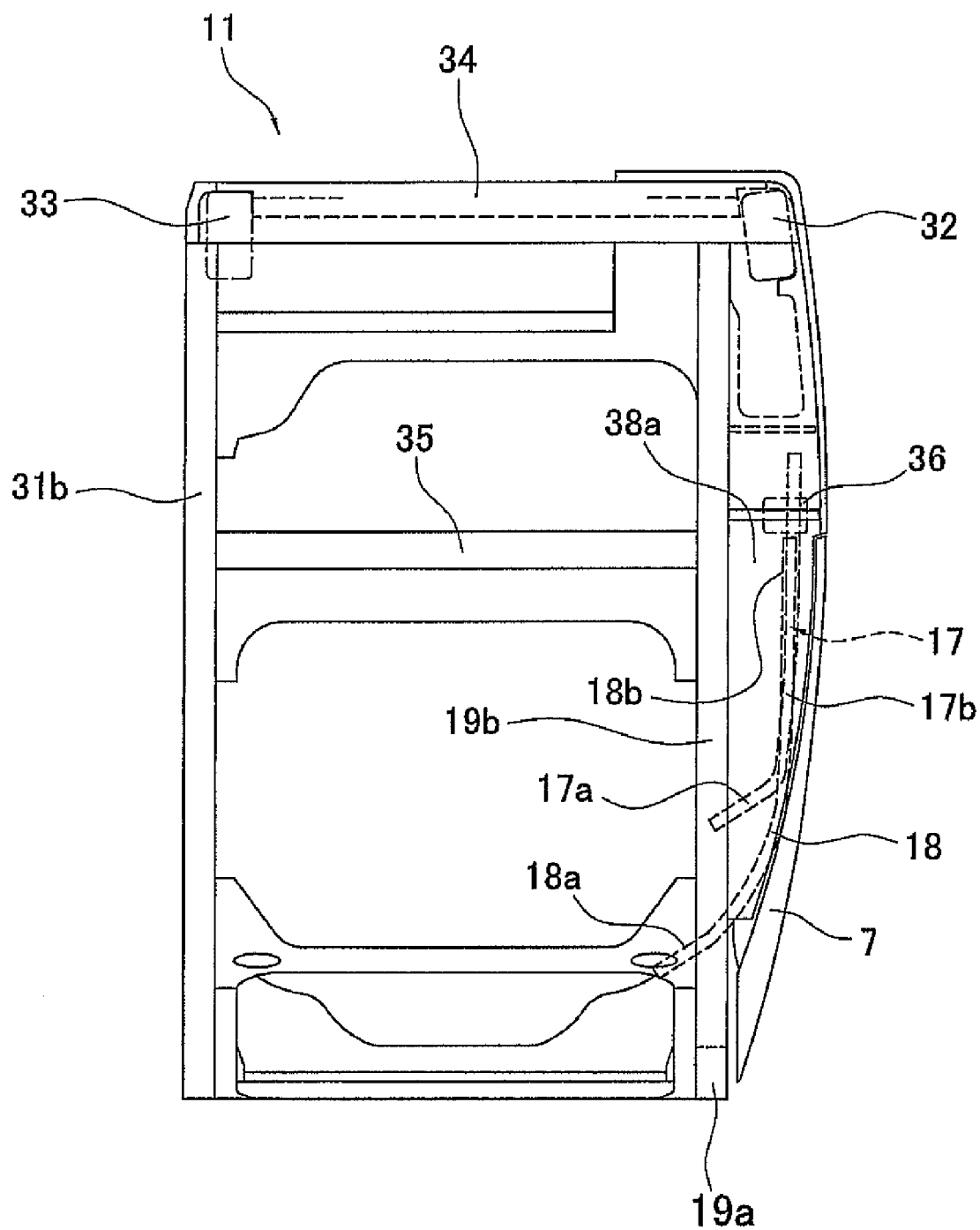
FIG. 6 is a top view of the frame body.

The middle column member 36 (second column member) is a straight pipe-shaped member that is disposed along approximately the vertical direction. The middle column member 36 is disposed rearward from the first column portion 19a and frontward from the left rear column member 32. The middle column member 36 is also disposed in the middle position between the first column portion 19a and the left rear column member 32. Note that as described above, the left lateral surface of the cab 10 is formed in the externally-bulging shape. Therefore, as illustrated in FIG. 6, the middle column member 36 is disposed on a position that is external to the right behind the first column portion 19a and is also external to the right below the beam portion 19b. Note that FIG. 6 is a top view of the frame body 11. Furthermore, as illustrated in FIG. 5, the lower end portion of the middle column member 36 is fixed to the floor frame 27a, and the middle column member 36 is disposed upright on the floor frame 27a. The upper end portion of the middle column member 36 is fixed to the lower surface of a first support member 37 to be described. With the middle column member 36, it is possible to enhance stiffness of the entire cab 10, and it is also possible to keep the balance of the cab 10 even when the sliding door 7 attached to the left lateral side of the cab 10 is slid.

(Support Member 12)

As illustrated in FIG. 5, the support member 12 is attached to the upper portion of the left surface of the cab 10 that includes the above described circular-arc portion so as to be disposed along the beam portion 19b of the left front column member 19. The support member 12 joins the beam portion 19b of the left front column member 19 and the left rear column member 32, and is fixed to the upper end of the middle column member 36. Accordingly, it is possible to rigidly join the rear end portion of the beam portion 19b of the left front column member 19 and the upper end portion of the left rear column member 32, both of which are in different phases, together with the rear beam member 34. In addition, the support member 12 is disposed along and above the region in which the sliding door 7 is slid, and is provided with the upper guide portion 17 to be described. The support member 12 is formed by the combination of the first support member 37 and a second support member 38.

Figure 7:
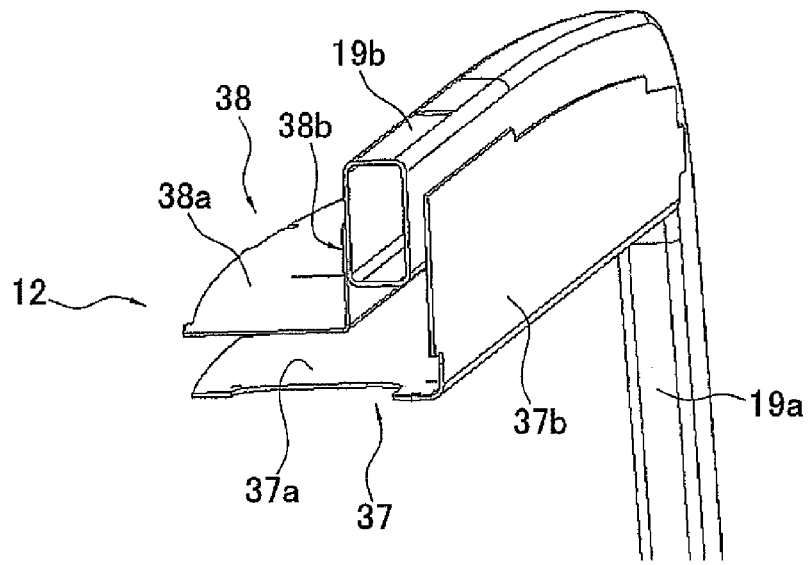
FIG. 7 is a cross-sectional view illustrating a structure of a support member.

The first support member 37 is a sheet metal member with the L-shaped cross-section. The front end portion thereof is fixed to the rear surface of the upper portion of the first column portion 19a, and the rear end portion thereof is disposed between the middle column member 36 and the left rear column member 32. As illustrated in FIG. 7, the first support member 37 includes a first horizontal surface 37a parallel to the horizontal direction and a first vertical surface 37b parallel to the vertical direction. Note that FIG. 7 is a cross-sectional view illustrating a structure of the support member 12. The first horizontal surface 37a is disposed below the beam portion 19b, and laterally protrudes from the beam portion 19b. The left side end portion of the first horizontal surface 37a is formed in a curved outer shape that bulges outward seen from the above. In addition, it is formed in a shape that fits along the above described circular-arc portion. Furthermore, the first horizontal surface 37a is formed in a tapered shape that the width thereof is reduced toward the front side. The first horizontal surface 37a is disposed to pass through a position right above the middle column member 36, and the upper end portion of the middle column member 36 is fixed to the lower surface of the first horizontal surface 37a. Note that the upper surface of the first horizontal surface 37a is configured to support and guide an after-mentioned first vertical guide roller 43 of the sliding door 7. The lower end portion of the first vertical surface 37b is connected to the right end portion of the first horizontal surface 37a, and the upper portion of the left lateral surface of the first vertical surface 37b is fixed to the inner surface of the beam portion 19b.

The second support member 38 is a sheet metal member with the L-shaped cross-section as is the case with the first support member 37, and is disposed above the first support member 37. The front end portion of the second support member 38 is disposed on a position slightly behind the bent portion of the left front column member 19, and the rear end portion thereof is fixed to the rear beam member 34. The second support member 38 includes a second horizontal surface 38a and a second vertical surface 38b. The second horizontal surface 38a is disposed along the beam portion 19b so as to be opposed in parallel to the first horizontals surface 37a of the first support member 37. The upper end of the left rear column member 32 is fixed to the rear end portion of the lower surface of the second horizontal surface 38a. In addition, the left end portion of the second horizontal surface 38a laterally protrudes from the beam portion 19b, and is formed in a curved shape seen from the above, as is the case with the left end portion of the first horizontal surface 37a. In other words, the second horizontal surface 38a is also formed in a tapered shape that the width thereof is reduced toward the front side as is the case with the first horizontal surface 37a. Note that the upper guide portion 17 to be described is attached to the lower surface of the second horizontal surface 38a. The lower end portion of the second vertical surface 38b is connected to the right end portion of the second horizontal surface 38a, and the upper portion of the right lateral surface of the second vertical surface 38b is fixed to the outer surface of the beam portion 19b.

(Panel Member)

The plurality of panel members 13-16 illustrated in FIG. 4 are attached to cover the above described frame body 11, and are formed by a sheet metal member for which press working or the like was performed. The plurality of panel members 13-16 include the side panels 14 and 16, the top panel 13, the rear panel 15, and the like. A glass window (not illustrated in the figure) is framed in an opening formed in each of the panel members 13-16.

In addition, the side panel 16 to be attached to the left lateral surface of the cab 10 and a side frame 39 attached to cover the outside of the support member 12 form a circular-arc portion to be appeared on the left lateral surface of the cab 10. Therefore, they are configured to be formed in a shape approximate to a circular-arc of a circle that the center thereof is the swivel center O. Note that a middle roller guide groove is provided in the central portion of the side panel 16 in the up and down directions. The middle roller guide groove is formed to be dented toward the inward direction of the cab 10 from the surface of the side panel 16, and is provided along the back and forth directions.

(Sliding Door 7)

Figure 8:
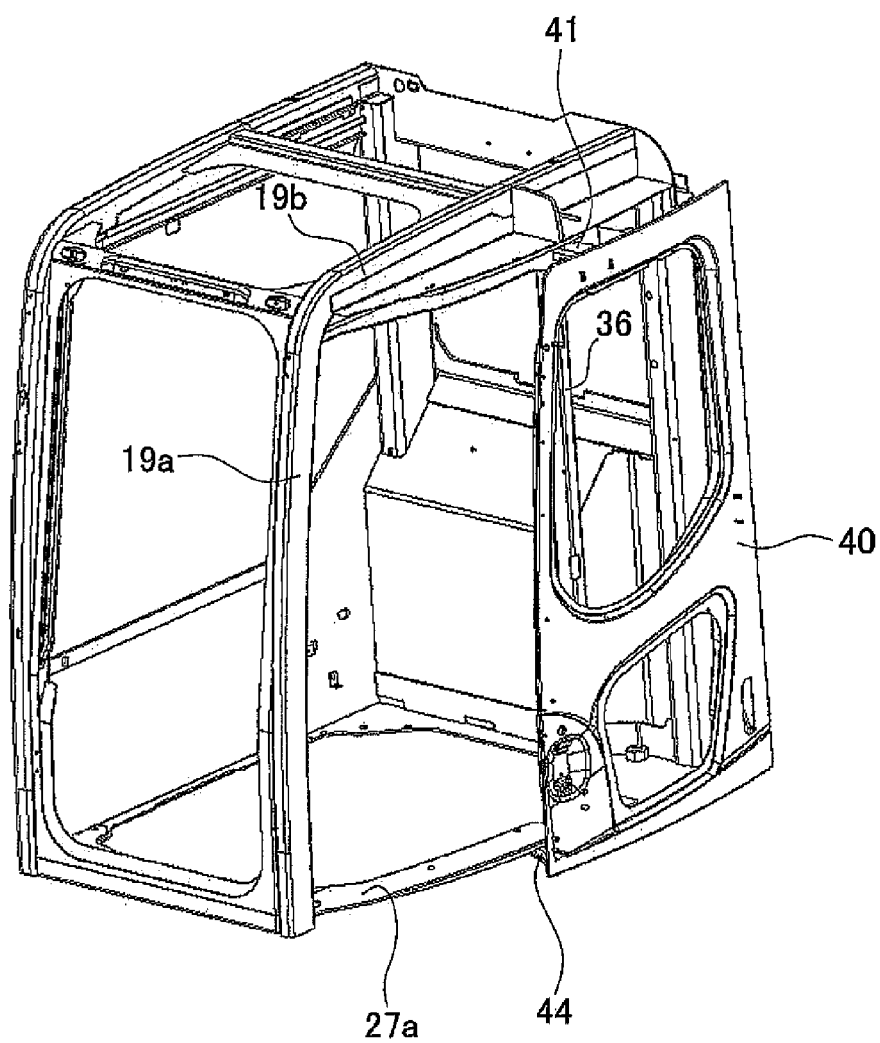
FIG. 8 is a view illustrating how a sliding door and the frame body are attached to each other.
Figure 9:
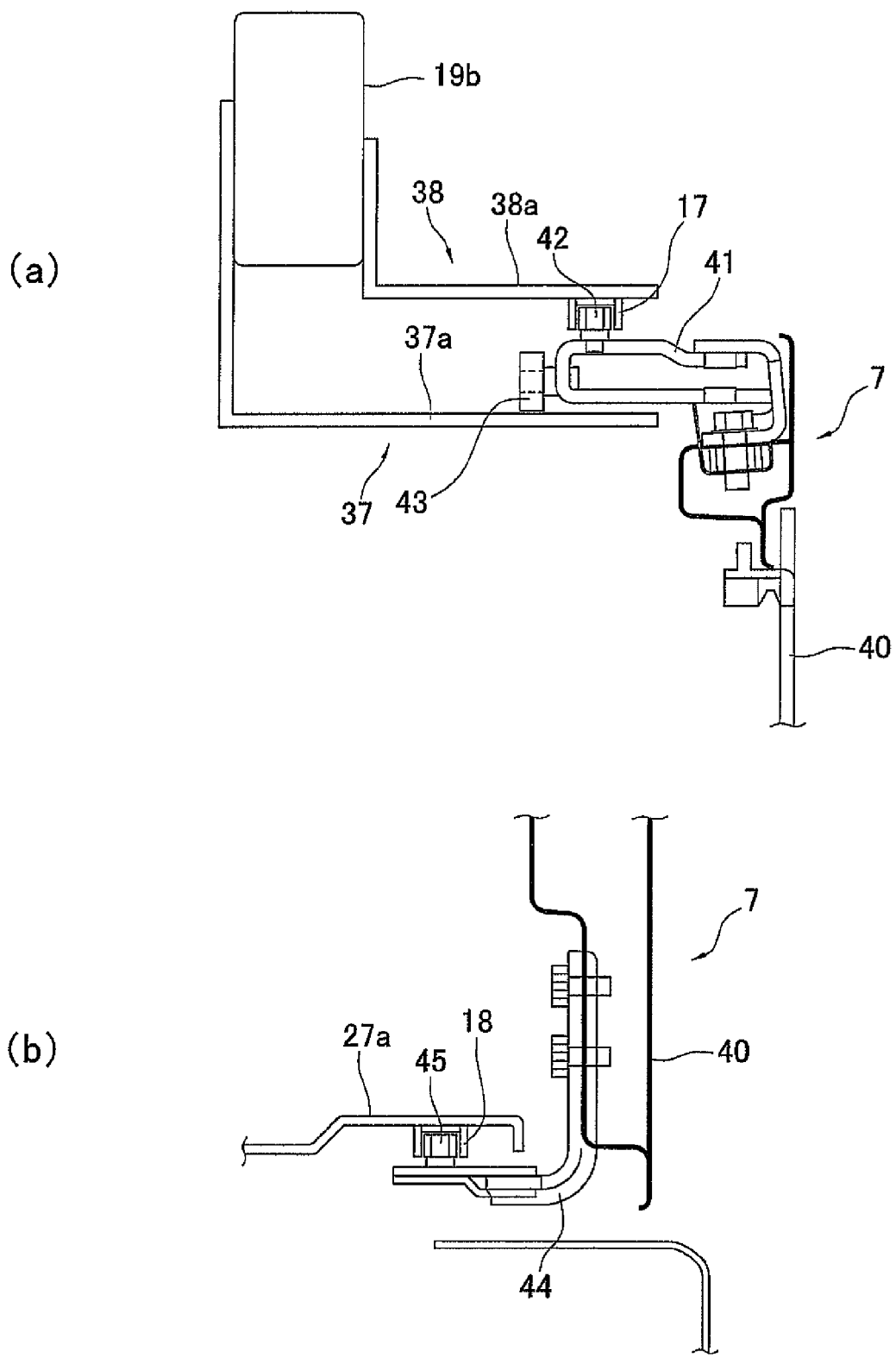
FIG. 9 includes views illustrating the support structure of the sliding door.
Figure 10:
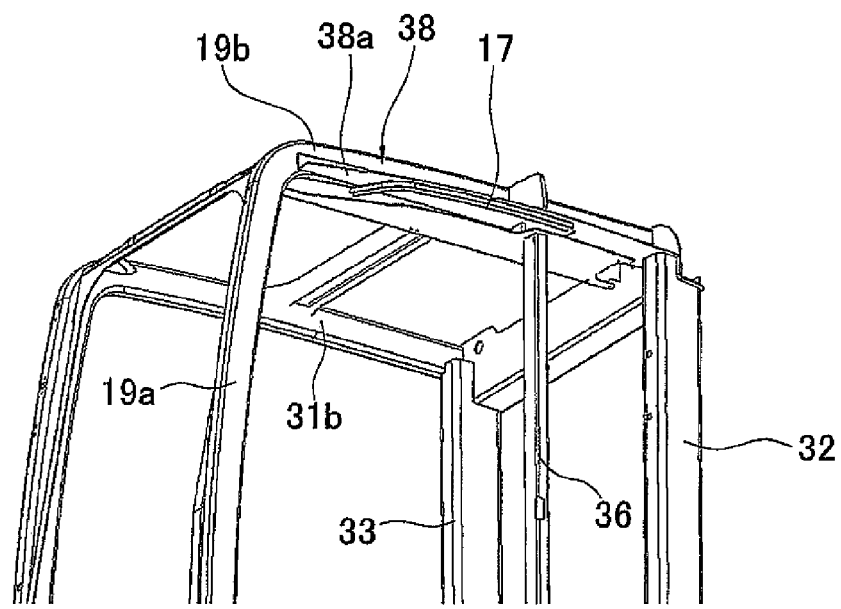
FIG. 10 is a view illustrating attachment of an upper guide portion.

The sliding door 7 is a member for opening/closing the doorway provided between the first column portion 19a and the middle column member 36. As illustrated in FIGS. 8 and 9, the sliding door 7 includes a door body 40, a first arm member 41, a first horizontal guide roller 42, the first vertical guide roller 43, a second arm member 44, and a second horizontal guide roller 45. Note that FIG. 8 illustrates a state that the sliding door 7 is attached to the frame body 11 for the purpose of illustrating how the sliding door and the frame body are attached to each other. In addition, FIG. 9 includes cross-sectional views illustrating the vicinity of the support structure of the sliding door.

The door body 40 is formed by the combination of sheet metal members, and is formed in approximately the rectangular shape seen from the lateral side. As illustrated in FIG. 8, the length of the door body 40 in the back and forth directions is configured to slightly exceed the length from the first column portion 19a of the left front column member 19 to the middle column member 36, and the length thereof in the up and down directions is configured to reach the length from the floor frame 27a to the beam portion 19b. In addition, the door body 40 is formed in a curved outer shape to fit in the circular-arc portion of the cab 10. Note that an opening is formed in the upper half portion of the door body 40, and a glass window is framed in the opening. In addition, a middle roller (not illustrated in the figure) is provided on the inner surface of the door body 40, and is guided by the middle roller guide groove of the side panel 16.

As illustrated in FIGS. 8 and 9 (a), the first arm member 41 is a member for supporting the upper end of the door body 40, and is provided in the upper portion of the inner surface of the door body 40. The first arm member 41 is disposed to protrude from the inner surface of the door body 40 toward the inward direction, and is disposed slightly behind the front end portion of the door body 40.

The first horizontal guide roller 42 (second guide roller) is a member that is restricted to move in the horizontal direction and is guided by the upper guide portion 17. The first horizontal guide roller 42 is disposed in the end portion of the upper surface of the first arm member 41, and is also disposed to be allowed to rotate around an axis parallel to the vertical direction.

The first vertical guide roller 43 (first guide roller) is a member that is supported and guided by the upper surface of the first horizontal surface 37a of the first support member 37. The first vertical guide roller 43 is disposed in the end surface of first arm member 41, and is also disposed to be allowed to rotate around an axis parallel to the horizontal direction. The first vertical guide roller 43 is rotationally moved while it makes contact with the upper surface of the first horizontal surface 37a.

As illustrated in FIGS. 8 and 9(b), the second arm member 44 is a member for supporting the lower end of the door body 40, and is disposed in the lower portion of the inner surface of the door body 40 so as to protrude from the inner surface of the door body 40 toward the inward direction. The second arm member 44 is disposed in the vicinity of the front end portion of the door body 40, and is located frontward from the first arm member 41 seen from the above.

The second horizontal guide roller 45 is a member that is restricted to move in the horizontal direction and is guided by the lower guide portion 18. It is disposed in the end portion of the upper surface of the second arm member 44, and is also disposed to be allowed to rotate around an axis parallel to the vertical direction.

(Upper Guide Portion 17)

The upper guide portion 17 (guide portion) is a guide rail for supporting and guiding the upper portion of the sliding door 7. As illustrated in FIGS. 9 (a) and 10, it is fixed to the lower surface of the second horizontal surface 38a of the second support member 38. The upper guide portion 17 is formed in a recessed shape that the downside thereof is opened, and restricts and guides movement of the sliding door 7 in the horizontal direction when the first horizontal guide roller 42, which is inserted into the recessed space of the upper guide portion 17 from beneath, rotationally moves along the upper guide portion 17. As illustrated in FIG. 6, the upper guide portion 17 is disposed along the beam portion 19b in a position ranging from a first position to a second position. Here, the first position is located frontward from the middle column member 36 and rearward from the first column portion 19a and the second position is located rearward from the middle column member 36. The upper guide portion 17 includes a front end portion that is formed in an inwardly-bent shape, and also includes a first front rail portion 17a and a first rear rail portion 17b.

The first rear rail portion 17b is formed to be gently curved along bulge of the lateral end portion of the second horizontal surface 38a, and is disposed along the back and forth directions. The first rear rail portion 17b is disposed to pass through a position right above the middle column member 36, and the lower end portion thereof is positioned in the second position that is located rearward from the middle column member 36. The front end portion of the first rear rail portion 17b is connected to the rear end portion of the first front rail portion 17a.

The first front rail portion 17a is smoothly and integrally formed with the first rear rail portion 17b to form a predetermined angle with the front end portion of the first rear rail portion 17b. The front end portion of the first front rail portion 17a is positioned between the first column portion 19a and the middle column member 36, and is also positioned to be slightly closed to the first column portion 19a. In addition, the front end portion of the first front rail portion 17a is positioned right below the beam portion 19b, and is disposed in a position where it overlaps with the beam portion 19b seen from the above.

As described above, the upper guide portion 17 is configured to be formed in the following shape. That is, it externally extends obliquely rearward from the first position, bends rearward in the vicinity of the lateral end portion of the second horizontal surface 38a, passes through the position right above the middle column member 36 while it gently curves, and reaches the second position that is located rearward from the middle column member 36.

(Lower Guide Portion 18)

As illustrated in FIGS. 6 and 9 (b), the lower guide portion 18 is a guide rail for supporting and guiding the lower portion of the sliding door 7, and is disposed on the lower surface of the floor frame 27a. The lower guide portion 18 is formed in a recessed shape that the downside thereof is opened, and restricts and guides movement of the sliding door 7 in the horizontal direction when the second horizontal guide roller 45, which is inserted into the recessed space of the lower guide portion 18 from beneath, rotationally moves along the lower guide portion 18. As illustrated in FIG. 6, the lower guide portion 18 is disposed along the beam portion 19b in the position ranging from a position that is located rearward from the first column portion 19a to a position that is located slightly-frontward from the middle column member 36 seen from the above. The lower guide portion 18 includes a front end portion that is formed in an inwardly-bent shape as is the case with the upper guide portion 17. However, the upper end portion thereof is positioned on the forward of the front end of the upper guide portion 17, and the rear end portion of the lower guide portion 18 is positioned frontward from the rear end portion of the upper guide portion 17. The lower guide portion 18 includes a second rear rail portion 18b and a second front rail portion 18a.

The second rear rail portion 18b is disposed to partially overlap with the first rear rail portion 17b, seen from the above, and is also disposed frontward from the first rear rail portion 17b.

The second front rail portion 18a is smoothly and integrally formed with the second rear rail portion 18b so as to form a predetermined angle with the front end portion of the second rear rail portion 18b. The front end portion thereof is positioned on the inward of the beam portion 19b.

In the cab 10 included in the hydraulic excavator 1, the upper guide portion 17 is disposed in the position ranging from the first position that is located rearward from the first column portion 19a to the second position that is located rearward from the middle column member 36. Thus, the entire length of the upper guide portion 17 is secured to be long. Accordingly, it is possible to secure the opening width of the sliding door 7 to be wide.

Especially, the frame body 11 is formed by the combination of the pipe-shaped members. Therefore, strength of the cab 10 is secured, but the position to be allowed for the front end portion of the upper guide portion 17 is restricted. Specifically, it is difficult to dispose the front end portion of the upper guide portion 17 in the vicinity of the front end portion of the cab 10 because of the thickness of the first column portion 19a, bulge of the connected portion of the first column portion 19a and the beam portion 19b, and slope of the first column portion 19a. In addition, the circular-arc portion is provided on the lateral surface of the cab 10 for the purpose of reducing the amount of a portion of the cab 10 that protrudes from the vehicle body width B during swiveling, and the support member 12 is formed in a tapered shape. The position allowed for the front end portion of the upper guide portion 17 is also restricted by the shape of the support member 12. In other words, the sliding door 7 is configured to be in an opened condition by sliding and moving rearward it after it is externally pulled in a closed condition. Because of this, it is necessary to provide the above described first front rail portion 17a on the second horizontal surface 38a. However, the width of the second horizontal surface 38a is formed to be narrow toward the front end side. Therefore, it becomes difficult to dispose the first front rail portion 17a when the upper guide portion 17 is intended to be disposed to reach the front end of the second horizontal surface 38a.

However, in the cab 10, the upper guide portion 17 is disposed to pass through the position right above the middle column member 36 and extends rearward from the position. Because of this, it is possible to extend the upper guide portion 17 rearward without being blocked by the middle column member 36, and it is also possible to secure the entire length of the upper guide portion 17 to be long. In addition, it is possible to prevent the cab 10 from externally bulging and to compactly form the cab 10, compared to a case that the upper guide portion 17 is disposed to pass through the outside of the middle column member 36.

The upper guide portion 17 is disposed to pass through the position right above the middle column member 36, and the first vertical guide roller 43, which is configured to rotationally move on the first horizontal surface 37a, also moves to pass through the position right above the middle column member 36. In addition, the upper end of the middle column member 36 is fixed to the lower surface of the first horizontal surface 37a. Accordingly, it is possible to further reliably support the sliding door 7.

Especially, the hydraulic excavator 1 may be operated while the sliding door 7 is opened, but even in the case, it is possible to further reliably support the sliding door 7.

In addition, the support member 12 is a member for disposing the upper guide portion 17 on the frame body 11. The support member 12 is joined to the beam portion 19b, the rear beam member 34, and the left rear column member 32, and thus functions as a reinforcement member for reinforcing junctions of the respective members 19b, 32, and 34. Therefore, in the cab 10, the support member 12 to be used as a reinforcement member is also used as a member for providing the upper guide portion 17. Thus, increase of the number of parts is inhibited.

Furthermore, the support member 12 is formed by the combination of two sheet metal members with the L-shaped cross-section. Therefore, it is easier to manufacture the support member 12, compared to a case that a space in which the upper guide portion 17 is provided is formed by processing a pipe-shaped member.

Figure 11:
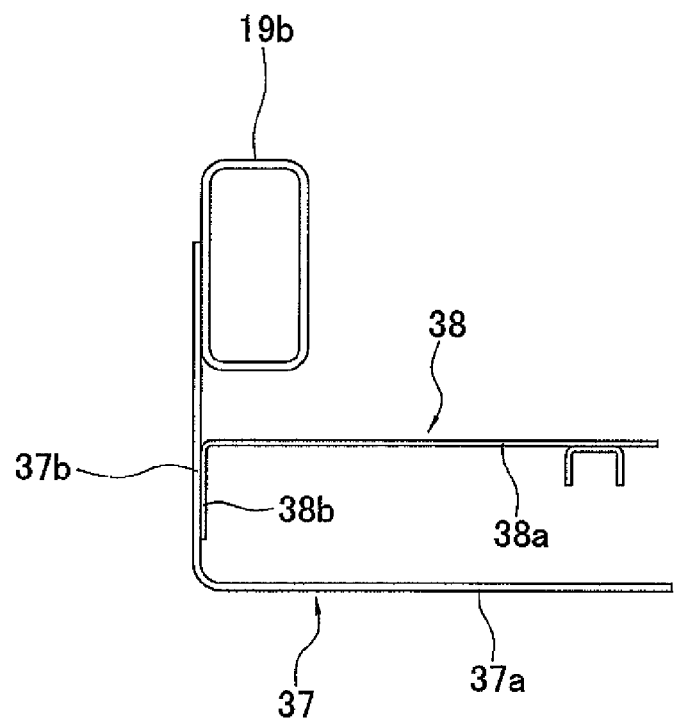
FIG. 11 is a view illustrating the structure of a support member in accordance with another embodiment.

ALTERNATIVE EMBODIMENTS (A) As illustrated in FIG. 7, in the above described embodiment, the support member 12 is formed when two sheet metal members with the L-shaped cross-section, that is, the first support member 37 and the second support member 38, are disposed in parallel to each other and are fixed to the beam portion 19b, respectively. However, the configuration of these members is not limited to the above described configuration as long as at least the first horizontal surface 37a of the first support member 37 and the second horizontal surface 38a of the second support member 38 are disposed to be opposed in parallel to each other, and a space into which the first arm member 41 and the second arm member 44 of the sliding door 7 are inserted is formed. For example, as illustrated in FIG. 11, the second vertical surface 38b of the second support member 38 may be fixed to the first vertical surface 37b of the first support member 37 that is fixed to the beam portion 19b. In this case, the second horizontal surface 38a is also vertically fixed to the first vertical surface 37b. As a result, the first horizontal surface 37a and the second horizontal surface 38a are disposed to be opposed in parallel to each other.

(B) In the above described embodiments, the first column portion 19a and the beam portion 19b are formed by bending a pipe-shaped member. However, the left front column member 19 may be formed by integrally forming the first column 19a and the beam portion 19b, both of which are separately provided, by means of weld or the like.

The present invention achieves an effect that it is possible to secure the opening width of a sliding door to be large, and it is useful as a cab structure of a construction machine.

The invention claimed is:

1. A cab structure of a construction machine comprising:
   a frame body including a plurality of pipe-shaped members, the pipe shaped members including a first column portion, a beam portion, and a second column portion, the first column portion being provided generally along a vertical direction, the beam portion being provided generally along the back and forth direction, a front end portion of the beam portion being connected to an upper end portion of the first column portion, the second column portion being provided generally along the vertical direction, the second column portion being disposed rearward from the first column portion, an upper end portion of the second column portion being disposed in a position vertically lower than the beam portion;
   a sliding door configured and arranged to open and close a doorway formed between the first column portion and the second column portion; and
   a guide portion configured and arranged to guide the sliding door, the guide portion being provided along the beam portion in a position ranging from a first position to a second position passing over the upper end portion of the second column portion, the first position being located frontward from the second column portion and rearward from the first column portion, and the second position being located rearward from the second column portion.

2. The cab structure of a construction machine according to claim 1, further comprising
   a first support member arranged below the guide portion along the beam portion, the first support member including a lower surface to which an upper end of the second column portion is fixed, and the first support member including an upper surface by which the sliding door is supported,
   the guide portion being configured and arranged to guide the sliding door while the guide portion restricts movement of the sliding door in the right and left direction of the cab structure.

3. The cab structure of a construction machine according to claim 2, wherein
   the second column portion is positioned on an outside with respect to the first column portion in the right and left direction.

4. The cab structure of a construction machine according to claim 2, further comprising
   a second support member provided along the beam portion generally above the first support member so that the second support member is coupled to the beam portion on an opposite side of the first support member, and the second support member laterally protruding from the beam portion,
   the guide portion being provided on a lower surface of the second support member, and
   the sliding door including a first guide roller and a second guide roller, the first guide roller being supported by the upper surface of the first support member, and the second guide roller being guided by the guide portion while the second guide roller is restricted to move in the right and left direction of the cab structure by the guide portion.

5. The cab structure of a construction machine according to claim 4, wherein
   the cab structure is disposed on an upper swivel attached on a base carrier, and
   a lateral surface of a cab on which the sliding door is provided is formed in a curved shape that externally bulges out.

6. A cab structure of a construction machine comprising:
   a frame body including a plurality of pipe-shaped members, the pipe shaped members including
      a left front column member including a first column portion and a beam portion, the first column portion being provided generally along a vertical direction, the beam portion being provided generally along the back and forth direction, and a front end portion of the beam portion being connected to an upper end portion of the first column portion,
      a right front column member having a shape that is a mirror image of the left front column member, the right front column member being spaced apart from the left front column member in the right and left direction,
      a left rear column member being provided generally along the vertical direction, the left rear column member being positioned rearward from the first column portion of the left front column member,
      a right rear column member being provided generally along the vertical direction, the right rear column member being positioned rearward from a column portion of the right front column member, and
      a middle column member being provided generally along the vertical direction, the middle column member being positioned between the first column portion and the left rear column member in the back and forth direction, an upper end portion of the middle column member being disposed in a position vertically lower than the beam portion of the left front column member; and
   a sliding door configured and arranged to open and close a doorway formed between the first column portion and the middle column member; and
   a guide portion configured and arranged to guide the sliding door, the guide portion being disposed along the beam portion of the left front column member in a position ranging from a first position to a second position passing over the upper end portion of the middle column member, the first position being located frontward from the middle column member and rearward from the first column portion, and the second position being located rearward from the middle column member.

* * * * *